United States Patent
Brower et al.

(10) Patent No.: US 9,460,144 B2
(45) Date of Patent: Oct. 4, 2016

(54) LOCK ACCELERATION

(75) Inventors: David Brower, Alamo, CA (US);
Angelo Pruscino, Los Altos, CA (US);
Wilson Chan, San Mateo, CA (US);
Tak Fung Wang, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 721 days.

(21) Appl. No.: 13/350,535

(22) Filed: Jan. 13, 2012

(65) Prior Publication Data
US 2013/0185270 A1    Jul. 18, 2013

(51) Int. Cl.
*G06F 7/00*        (2006.01)
*G06F 17/00*       (2006.01)
*G06F 17/30*       (2006.01)
*G06F 13/14*       (2006.01)

(52) U.S. Cl.
CPC .............................. *G06F 17/30362* (2013.01)

(58) Field of Classification Search
CPC .................. G06F 17/30171; G06F 17/30362; G06F 17/30949
USPC .................. 707/704, 741, 999.008, E17.036, 707/E17.052, 747, 769, 802, 999.1, 707/E17.007; 709/225–229, 235, 243
See application file for complete search history.

(56) References Cited

U.S. PATENT DOCUMENTS

| | | | | |
|---|---|---|---|---|
| 5,890,153 A * | 3/1999 | Fukuda | ............. | G06F 17/30362 707/704 |
| 7,657,564 B2 * | 2/2010 | Hsu | ....................... | H03H 1/0007 361/45 |
| 7,657,654 B2 * | 2/2010 | Cohen et al. | .................. | 709/243 |
| 7,742,473 B2 * | 6/2010 | Adams | .................... | H04L 49/90 370/389 |
| 7,827,302 B2 * | 11/2010 | Weinert | .................. | H04L 67/10 707/738 |
| 8,539,199 B2 * | 9/2013 | Burroughs | ............ | G06F 9/3851 707/747 |
| 9,152,666 B2 * | 10/2015 | Lin | ..................... | G06F 17/30362 |
| 2003/0131041 A1 * | 7/2003 | Dinker | ....................... | G06F 9/52 718/104 |

* cited by examiner

*Primary Examiner* — Usmaan Saeed
*Assistant Examiner* — Cecile Vo
(74) *Attorney, Agent, or Firm* — Osha Liang LLP

(57) ABSTRACT

A method for locking resources, including: receiving, by an accelerator, a first request from a first client to lock a first resource; evaluating, by a computer processor of a server, a hash function using an identifier of the first resource as an input to the hash function; identifying, by the computer processor and based on evaluating the hash function, a first hash bucket in a shared memory residing in a physical memory of the server; detecting that the first hash bucket is occupied; and sending the first request to a master lock monitor residing in a user space of the server based at least on detecting that the first hash bucket is occupied.

16 Claims, 7 Drawing Sheets

LOCK ACCELERATION

BACKGROUND

Locking is an essential part of resource management within any modern computer system. A lock may be required when multiple clients are given concurrent access to a set of resources. For example, databases can include hundreds or thousands of resources such as tables, rows, and fields. Modern database management systems (DBMSs) can be distributed across multiple nodes and may provide concurrent access to thousands of clients at a given time. File systems, too, can include many resources (e.g., files, directories, and partitions) and may be configured to provide concurrent access to multiple clients.

Various different types of DBMS architectures exist. In a non-clustered DBMS, a single database instance may access a single database. The database may include a collection of data files, control files, and logs located on disk. The instance may include the collection of DBMS-related memory and operating system processes that run on a computer system.

In a clustered DBMS, two or more computers (each with an instance) may concurrently access a single database. This allows an application or user to connect to either computer and have access to a single coordinated set of data. Additionally, the DBMS may use either a shared-nothing or a shared-everything architecture. A shared-everything architecture shares both disk and memory between nodes in the cluster, while a shared-nothing architecture shares neither.

Much of the data stored within these and other resources is highly sensitive. Everything from experimental data used by scientists to financial data used by online banking applications is stored within complicated systems requiring concurrent access rights and scalability. It is evident that maintaining the integrity of this data is a fundamental objective of most resource management systems. Locking mechanisms employed by such systems are intended to prevent data corruption by performing sensitive transactions atomically and by controlling access to resources in a manner that prevents deadlock, race conditions, and other hazardous program states.

Locking is also associated with substantial inefficiency. When a resource is locked by a requesting client, other clients may incur substantial delay in obtaining access to the resource. Furthermore, existing locking mechanisms may result in increased latency and performance degradation and may include significant hurdles to scalability.

SUMMARY

In general, in one aspect, the invention relates to a method for locking resources. The method steps include: receiving, by an accelerator, a first request from a first client to lock a first resource; evaluating, by a computer processor of a server, a hash function using an identifier of the first resource as an input to the hash function; identifying, by the computer processor and based on evaluating the hash function, a first hash bucket in a shared memory residing in a physical memory of the server; detecting that the first hash bucket is occupied; and sending the first request to a master lock monitor residing in a user space of the server based at least on detecting that the first hash bucket is occupied.

In general, in one aspect, the invention relates to a method for locking resources. The method steps include: receiving, by an accelerator residing in kernel space, a request from a client to lock a resource; determining, by a computer processor, that the resource is exclusively locked; and sending the request to a master lock monitor residing in user space in response to determining that the resource is exclusively locked.

In general, in one aspect, the invention relates to a system for locking resources. The system includes: a computer processor; a physical memory including a shared memory; an accelerator executing on the computer processor and configured to: receive a first request from a first client to lock a first resource; evaluate a hash function using an identifier of the first resource as an input to the hash function; identify, based on evaluating the hash function, a first hash bucket in the shared memory; detect that the first hash bucket is occupied; and send the first request to a master lock monitor based at least on detecting that the first hash bucket is occupied; and a user space, including: a virtual memory including a variable lock database; and the master lock monitor.

In general, in one aspect, the invention relates to a non-transitory computer-readable storage medium including instructions for locking resources. The instructions include functionality to: receive, by an accelerator, a first request from a first client to lock a first resource; evaluate a hash function using an identifier of the first resource as an input to the hash function; identify, based on evaluating the hash function, a first hash bucket in a shared memory residing in a physical memory of the server; detect that the first hash bucket is occupied; and send the first request to a master lock monitor residing in a user space of the server based at least on detecting that the first hash bucket is occupied.

Other aspects of the invention will be apparent from the following description and the appended claims.

DETAILED DESCRIPTION

Figure 1A:
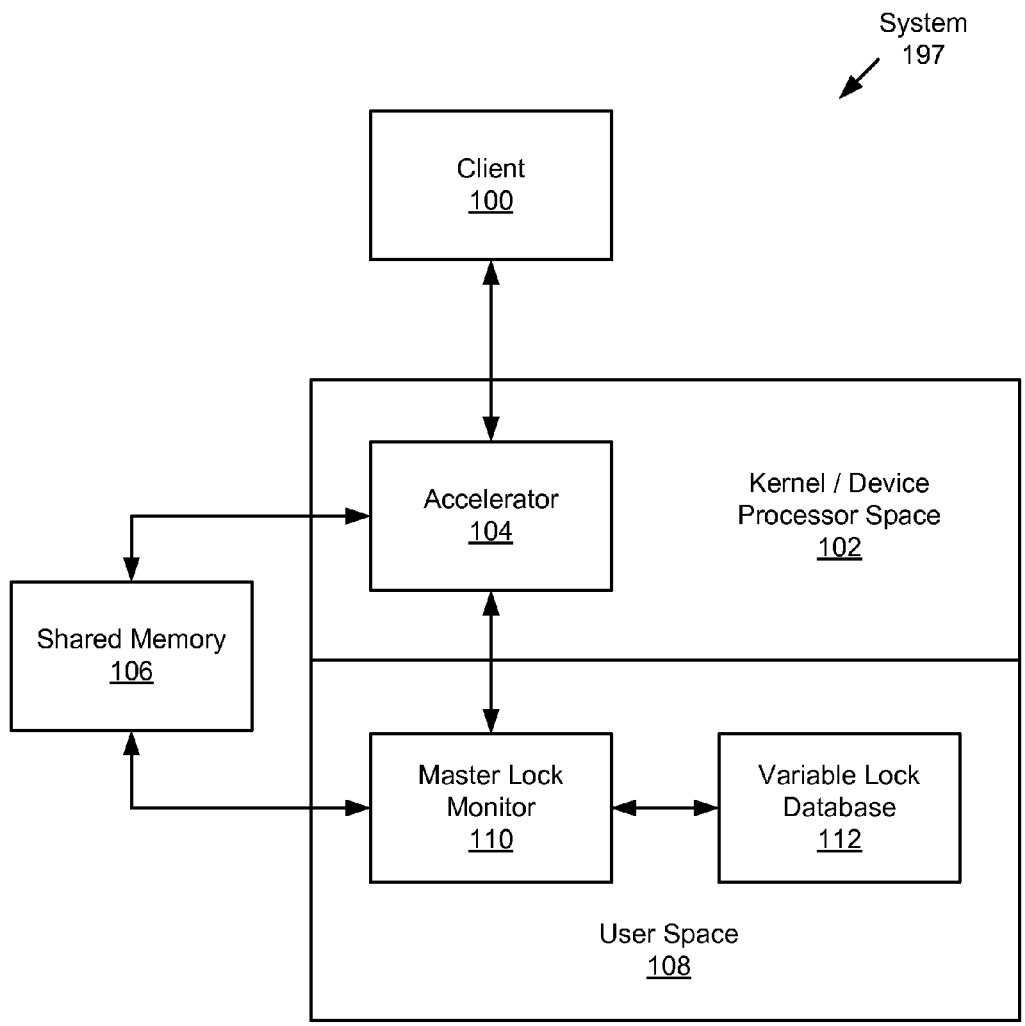
FIGS. 1A and 1B show schematic diagrams of systems in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for locking a resource. A request to lock the resource may be received by an accelerator residing in a kernel/device processor space of a server. The accelerator evaluates a hash function to identify a hash bucket in a shared memory. If the hash bucket is occupied, the request is forwarded to a master lock monitor residing in a user space of the server and may be queued by the master lock monitor until the resource becomes available. If the hash bucket is empty, it is determined that the resource is not exclusively locked by any other clients. In this case (i.e., the hash bucket is empty), the lock state element referencing the resource is inserted into the hash bucket and the request is fulfilled by the accelerator. If the accelerator is disabled, all requests are forwarded to the master lock monitor for fulfillment, regardless of the state of the hash bucket.

FIG. 1A shows a system (197) in accordance with one or more embodiments of the invention. As shown in FIG. 1A, the system includes multiple components such as a kernel/device processor space (102), an accelerator (104), a shared memory (106), a user space (108), a master lock monitor (110), a variable lock database (112), and a client (100). Various components of the system (197) may be located on the same device (e.g., a server, mainframe, desktop Personal Computer (PC), laptop, Personal Digital Assistant (PDA), or any computing device) or may be located on separate devices connected by a network (e.g. the Internet), with wired and/or wireless segments. Those skilled in the art will appreciate that there may be more than one of each separate component running on a device, as well as any combination of these components within a given embodiment of the invention.

In one or more embodiments of the invention, examples of a resource may include, but are not limited to, a file in a file system, one or more regions (blocks) in a file, a table/row/field or other object in a database, a segment of memory in a memory device, and/or any other resource capable of being accessed by one or more clients. The resource may reside within a set of resources (e.g., database instance, file system, etc.) configured to provide concurrent access to two or more clients.

In one or more embodiments of the invention, a lock is a right to use a resource. A lock may be an exclusive lock (X) or a shared lock (S). A lock may be granted to one or more entities capable of reading and/or modifying the resource. An X lock may be granted to a single entity capable of modifying the current value of a resource. An S lock may be granted to one or more entities that will not modify the resource, and need the current value. A consistent read (CR) copy of a resource may be granted to multiple entities that need a previous, non-current version of the resource. No S locks may be held when an X is granted; an X grant waits for all S holders to release the lock first. In reverse, an S lock grant first waits for release of the X lock holder. A CR request need not wait for lock release, and does not block the grant of X or S locks.

The kernel/device processor space (102) may be either a kernel space of a computer system or a device processor space of a device. In one or more embodiments of the invention, the kernel space is a segment of memory in a computer system (either virtual or physical) where the kernel, kernel extensions, one or more device drivers, and/or other special purpose processes and data reside. In one or more embodiments of the invention, the device processor space is a segment of memory within a specialized hardware device having a processor. The device processor space may reside in an embedded system or a special purpose computer system with or without an operating system. For example, the hardware device may be a network interface card (NIC) having a processor. In this example, the processor of the NIC is configured to execute the accelerator within the device processor space.

In one or more embodiments of the invention, the user space (108) is a segment of memory (either virtual or physical) where user mode applications, user application data, and/or other processes and data reside.

In one or more embodiments of the invention, the accelerator (104) includes functionality to receive a request to lock a resource from a client (e.g., client (100)). The request may be transmitted over a network (e.g., a local area network (LAN), the Internet, etc.), a direct connection, and/or may be received from a process or entity operatively connected to the accelerator (104) within a computer system.

In one or more embodiments of the invention, if the client (100) is a user process executing in the user space (108) of the system holding the master lock monitor, any lock requests from the client (100) are handled by the master lock monitor (110) in order to avoid the latency of switching to the kernel/device processor space (102). If the client (100) is a kernel component and the accelerator (104) is executing in kernel space, then requests from the client may be handled by the accelerator (104).

In one or more embodiments of the invention, a lock request for a resource is deemed contended if (1) the resource is currently locked by another client and (2) the mode of the request is incompatible with the mode of the currently held lock. As a result, the lock request is deemed uncontended if (1) the resource is not currently locked by any other clients or (2) the resource is currently locked by another client and the mode of the request is compatible with the mode of the currently held lock.

The mode of a lock request or an existing lock may be exclusive or shared. A shared mode is compatible with other shared modes but is not compatible with an exclusive mode. An exclusive mode is not compatible with any other lock modes. Thus, an exclusive lock request may only be fulfilled if the resource is not currently locked by any other clients. In one or more embodiments of the invention, a Null mode is also not compatible with any other lock modes.

In one or more embodiments of the invention, a consistent read (CR) request is not a lock request, but rather, a request for a certain version of the resource (i.e., prior to one or more modifications). Consistent read (CR) may also be an attribute of a shared lock request such that, if it is not possible to grant the lock request, a CR copy is granted instead. A CR request is always compatible with any type of existing lock. In one or more embodiments of the invention, if there is no existing lock or there is an existing shared (S) lock, the CR request may be granted an S lock by default. If there is an existing exclusive (X) lock, a CR copy is generated for the CR request. In one or more embodiments of the invention, the CR request is accompanied by a lock sequence (144) number indicating which version of the resource is requested. In one or more embodiments of the invention, the accelerator (104) includes functionality to grant a shared lock in response to a consistent read (CR) request.

In one or more embodiments of the invention, a client (e.g., client (100)) is any entity capable of accessing a resource. Examples of a client may include, but are not limited to, a process, an application, a thread, a computing device, a distributed database management system (DBMS) instance, a website, a distributed file system node, and a hardware device capable of accessing a resource.

In one or more embodiments of the invention, the accelerator (104) includes functionality to evaluate a hash function. A hash function is any process or mathematical function for mapping an original data set to a smaller data set (i.e., a "hash bucket"). For example, the hash function $f(z)=z \bmod N$ takes an integer z as input and outputs the modulo of z with an integer N. The hash function may be evaluated using a resource identifier of the resource as an input to the hash function (in the aforementioned example, z). In one or more embodiments of the invention, the resource identifier is any data capable of uniquely identifying the resource among a set of related resources. Examples of a resource identifier include, but are not limited to, a block identifier, a file offset, an inode number, a process identifier assigned by an operating system to a thread, a DBMS instance name, a network name of a computing device, a file descriptor, a Uniform Resource Identifier (URI), and a resource identifier of an element within a database.

In one or more embodiments of the invention, the variable lock database (112) is a repository of lock related information. Lock related information may include, but is not limited to, lock requests, current locks, lock queues, and/or related information necessary to implement a queuing protocol or to perform other lock related functions.

In one or more embodiments of the invention, the shared memory (106) is a repository storing only current fixed lock information (as compared to the variable lock data) for granted locks or locks which are in the process of being granted. Thus, the shared memory (106) may be modified to store information relating to certain locks and to remove that information when said locks are released. In one or more embodiments of the invention, the shared memory (106) is smaller and faster than the variable lock database (112). The shared memory (106) may be accessible to one or more user, kernel and/or device processes, while the variable lock database (112) may be accessible only to user processes, in accordance with various embodiments of the invention. In one or more embodiments of the invention, a synchronization mechanism may be used to ensure atomic read and write to the shared memory (106), in accordance with various embodiments of the invention.

In one or more embodiments of the invention, the accelerator (104) includes functionality to identify a hash bucket in the shared memory (106). The hash bucket may be identified based on an output of the hash function and may be a segment of memory within the accelerator (104). Thus, the hash function may be used to map each individual resource or request to a hash bucket. According to the selected hash function, two or more resources or requests may map to the same hash bucket. In this case, a collision (i.e., hash collision) may occur.

Figure 1B:
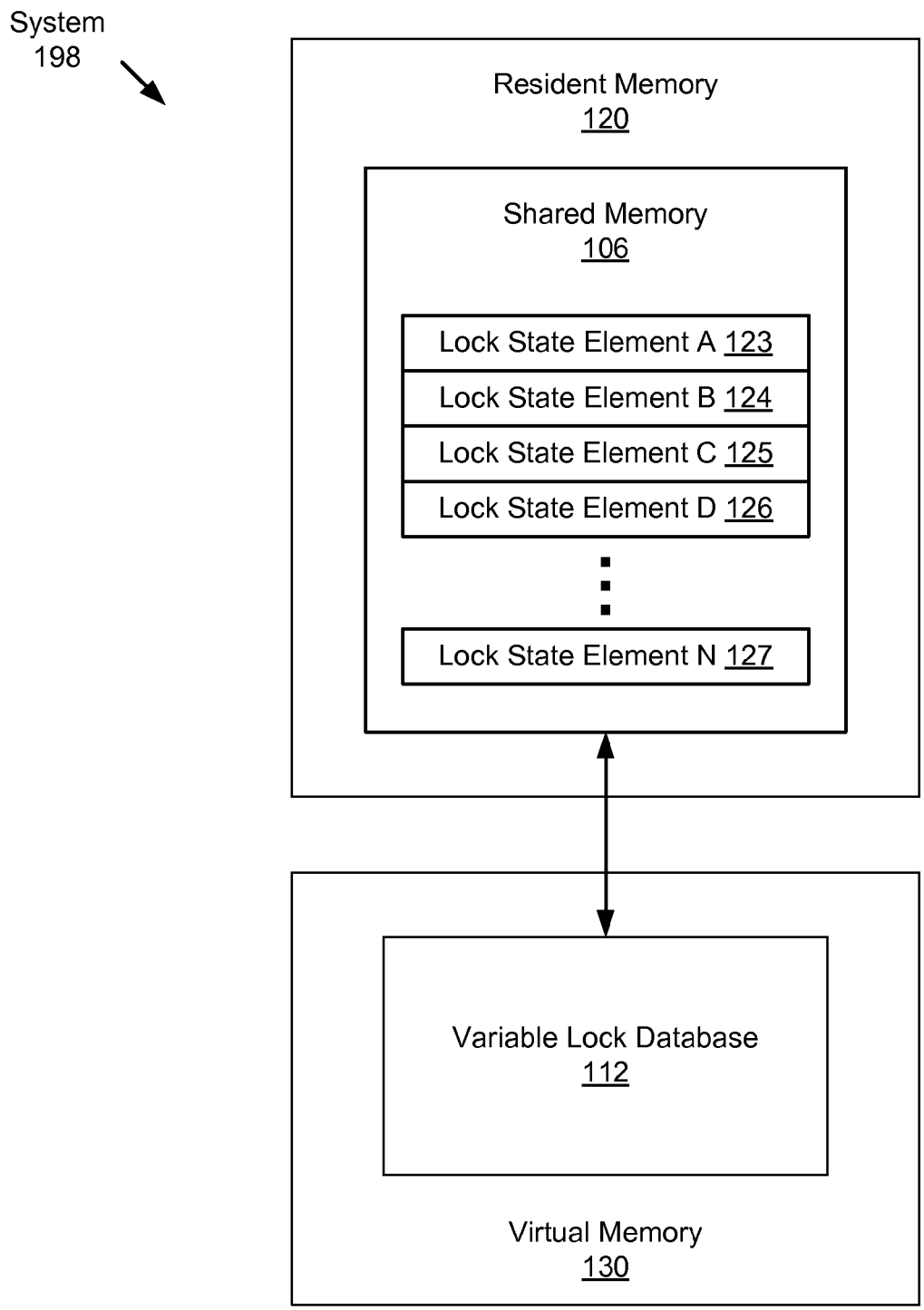

FIG. 1B shows a system (198) in accordance with one or more embodiments of the invention. As shown in FIG. 1B, the system has multiple components including a resident memory (120) including a shared memory (106) and a set of lock state elements (e.g., lock state element A (123), lock state element B (124), lock state element C (125), lock state element D (126), and lock state element N (127)), and a virtual memory (130) including a variable lock database (112). Various components of the system (198) may be located on the same device (e.g., a server, mainframe, desktop Personal Computer (PC), laptop, Personal Digital Assistant (PDA), or any other computing device) or may be located on separate devices connected by a network (e.g. the Internet), with wired and/or wireless segments. Those skilled in the art will appreciate that there may be more than one of each separate component running on a device, as well as any combination of these components within a given embodiment of the invention.

In one or more embodiments of the invention, the resident memory (120) is a portion of virtual memory (130) which is resident within physical memory of one or more computing devices. In one embodiment, the physical memory is primary storage. Examples of primary storage may include, but are not limited to, random access memory (RAM), processor cache, and read-only memory modules.

In one or more embodiments of the invention, the virtual memory (130) is an abstraction of one or more physical memory devices including primary secondary, and/or tertiary storage devices. Accordingly, in one or more embodiments of the invention, during operation of the system (198), data in the virtual memory (130) may reside within primary storage and/or one or more secondary/tertiary storage devices (e.g., a hard disk drive, optical disk drive, tape drive, and etc.). In one or more embodiments of the invention, the variable lock database (112) resides within the virtual memory (130).

In one or more embodiments of the invention, the shared memory (106) resides entirely within primary storage (e.g., resident memory (120)). Alternatively, only a portion of the shared memory (106) may reside within primary storage. In one or more embodiments of the invention, the shared memory (106) is smaller and/or has a lower read/write latency than the variable lock database (112). In one or more embodiments of the invention, the accelerator (104) and the master lock monitor (110) are both configured to access the shared memory (106), while only the master lock monitor is configured to access the variable lock database (112).

In one or more embodiments of the invention, the shared memory (106) includes a set of lock state elements (e.g., lock state element A (123), lock state element B (124), lock state element C (125), lock state element D (126), and lock state element N (127)).

Figure 1C:
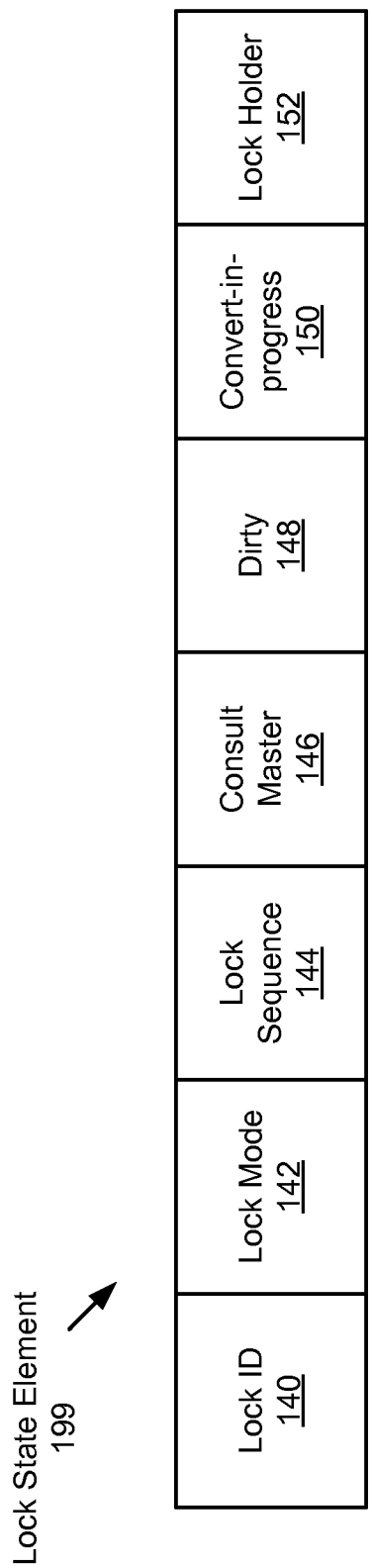
FIG. 1C shows a lock state element in accordance with one or more embodiments of the invention.

FIG. 1C shows a lock state element (199) in accordance with one or more embodiments of the invention. As shown in FIG. 1C, the lock state element (199) has multiple fields including lock ID (140), lock mode (142), lock sequence (144), consult master (146), dirty (148), convert-in-progress (150), and lock holder (152). Various fields of the lock state element (199) may be optional or may include additional components in accordance with various embodiments of the invention. The lock state element (199) of FIG. 1C, as with other components of FIGS. 1A-1C, is shown in exemplary form and is not intended to limit the invention in any way.

In one or more embodiments of the invention, the lock ID (140) field holds the identifier of the resource being locked. Thus, the lock ID field may store any unique identifier of a resource among a set of resources. The lock ID is also the input to the hash function in accordance with various embodiments of the invention.

In one or more embodiments of the invention, the lock mode (142) field stores the type of the lock. In one embodiment, the type of the lock may be either Null (N), Share (S), or Exclusive (X). A value of Null indicates that the lock is not currently locked and that the associated hash bucket is empty (i.e., unoccupied). A value of Share indicates that there is a shared lock on the resource while a value of Exclusive indicates that there is an exclusive lock on the resource.

In one or more embodiments of the invention, consult master (146) is a binary field indicating whether requests to lock the corresponding resource should bypass the accelerator (104) and be handled by the master lock monitor (110). For example, if the consult master (146) field is set to TRUE in a lock state element residing in the shared memory (106), the accelerator (104) will forward the request to the master lock monitor (110) for fulfillment.

In one or more embodiments of the invention, the dirty (148) field indicates whether uncommitted transactions exist in a cache of the resource. This field may be used in maintaining cache coherency and in implementing a cache coherency protocol in accordance with various embodiments of the invention.

In one or more embodiments of the invention, the convert-in-progress (150) field indicates whether any other convert requests are present in a convert queue (not shown) maintained by the master lock monitor (110). The convert queue may store requests to convert a shared lock to an exclusive lock or vice-versa. The convert queue may partly reside in the shared memory (106), and partly in the variable lock database (112). If the convert queue resides entirely within the shared memory (106), the requests within the convert queue may be handled by the accelerator (104) without involving the master lock monitor (110).

In one or more embodiments of the invention, the lock holder (152) field is a set or list of clients holding locks on the resource. This may be used by the master lock monitor (110) to manage shared locks or to forward requests to the appropriate instance of a distributed system for queuing. As with the convert queue, the lock holder (152) field may be split between the shared memory (106) and the variable lock database (112).

In one or more embodiments of the invention, the lock state element (199) includes an additional lock (i.e., additional locking fields) used in resolving concurrency with one or more other accelerators and/or master lock monitors.

Turning back to FIG. 1A, in one or more embodiments of the invention, the accelerator (104) includes functionality to detect whether a hash bucket is empty or occupied. An empty hash bucket is any hash bucket containing a lock state element which does not reference a resource (i.e., lock state element with a Null lock ID). An occupied hash bucket is any hash bucket having a lock state element which references a resource (i.e., a lock state element with a non-Null lock ID).

In one or more embodiments of the invention, the accelerator (104) includes functionality to determine, based on the hash bucket being empty, that the resource is not locked by any other clients. In this way, the accelerator (104) operates as a fast path for granting uncontended lock requests. If the hash bucket is occupied and there is contention, the request is forced to take a slower path to fulfillment (i.e., through the master lock monitor (110)). If there is no contention (i.e., the request is compatible with the current lock mode), then the accelerator (104) may grant the lock and respond without involving the master lock monitor (110).

In one or more embodiments of the invention, the accelerator (104) is configured to forward a lock request to the master lock monitor (110) if (a) the lock request is contended, (b) there is a collision in the hash bucket (i.e., a lock state element referencing a different resource ID already exists in the hash bucket), or (c) if there is any indication in the shared memory (106) that the request should be forwarded to the master lock monitor (110). In one or more embodiments of the invention, an indication in the shared memory (106) includes pending request count indicating a number of requests which are pending processing by the master lock monitor (110). The pending request count may be used by the accelerator (104) to determine when the accelerator can resume processing lock requests for a given bucket or whether to continue forwarding requests to the master lock monitor (110). In this case, the accelerator (104) forwards all requests to the master lock monitor (110) until the pending request count is zero (i.e., all pending requests have been handled by the master lock monitor (110)).

In one or more embodiments of the invention, an indication in the shared memory (106) includes a flag indicating that an out of order message is en route or pending processing. For example, if a cancel or close message is processed before the corresponding open message arrives, the accelerator may forward the lock request corresponding to the open message to the master lock monitor (110) based on an out-of-order flag in the shared memory being set. In another example, the pending request count is incremented in order to forward all requests to the master lock monitor (110) until the open message is received. Thus, in one or more embodiments of the invention, even if the hash bucket is empty or if a lock request is uncontended, the accelerator (104) may forward the request to the master lock monitor (110) based on an indication in the shared memory (106).

In one or more embodiments of the invention, the accelerator (104) includes functionality to insert a new lock state element into the hash bucket for a lock request. After inserting the new lock state element, the accelerator (104) may lock the resource and send a notification to the requesting client (e.g., client (100)) that the resource is locked. The accelerator (104) may be configured to forward subsequent lock requests for this resource to the master lock monitor (110) for queuing (while the resource is locked).

In one or more embodiments of the invention, the accelerator (104) includes functionality to determine, based on the hash bucket being occupied, that the resource is potentially locked by another client. Due to the fact that the hash bucket may store a lock state element of a different resource (i.e., in the case of a collision), the accelerator (104) may also forward one or more uncontended lock requests to the master lock monitor (110) for fulfillment.

In one or more embodiments of the invention, the accelerator (104) includes functionality to only grant uncontended locks to clients (e.g., client (100)). In other words, the accelerator (104) may not handle contended lock requests, although it may perform various other lock related functions, in accordance with various embodiments of the invention.

In one or more embodiments of the invention, the accelerator (104) is a process or a set of related processes configured to receive and fulfill uncontended exclusive lock requests and uncontended shared lock requests. The accelerator (104) may be implemented as a driver executing within kernel space (or as an integrated part of an operating system) or as one or more processes executing on a different CPU in a communication interface, in accordance with various embodiments of the invention.

In one or more embodiments of the invention, the master lock monitor (110) is a process or a set of related processes configured to perform locking and unlocking as well as lock queuing, convert queuing and/or other lock related functionality. Thus, the accelerator (104) may include only a subset of the locking functionality of the master lock monitor (110), in accordance with various embodiments of the invention.

In one or more embodiments of the invention, the accelerator (104) includes functionality to forward the request to the master lock monitor (110). The accelerator (104) may forward contended lock requests and lock requests for which a hash collision is detected to the master lock monitor (110). Additionally, in one or more embodiments of the invention, one or more lock requests may be forwarded to the master lock monitor (110) based on an indication in the shared memory (106) (e.g., a pending request count). In one or more embodiments of the invention, the accelerator (104) maintains statistics in order to determine which resources can be better handled by the accelerator (104) or master lock monitor (110). For example, if it is determined that requests for a given resource will longer be queued to the master lock monitor (110), the accelerator (104) may determine not to store the requests in kernel/device processor space (102) (i.e., the request may be replaced by a request for another resource hashed to same bucket instead).

In one or more embodiments of the invention, the accelerator (104) includes functionality to store the pending request count in the shared memory (106) accessible to both the master lock monitor (110) and the accelerator (104). This way, the master lock monitor (110) and the accelerator (104) may determine, based on the pending request count, that there are requests in flight and may synchronize waiting for that work to drain. For example, the master lock monitor (110) may clear the consult master (CM) flag when the variable lock database (112) queue is drained and there are no requests in flight.

In one or more embodiments of the invention, if the accelerator (104) experiences an error and/or a delay exceeding a predefined time threshold, the master lock monitor (110) may be configured to handle all requests until the accelerator (104) is again available.

In one or more embodiments of the invention, the master lock monitor (110) includes functionality to disable and/or enable the accelerator (104). For example, the master lock monitor (110) may disable the accelerator in order to modify the size of the shared memory (106). In one or more embodiments of the invention, when disabled, the accelerator (104) is configured to forward all requests to the master lock monitor (110) for fulfillment.

In one or more embodiments of the invention, the master lock monitor (110) includes functionality to queue a lock request according to a predefined queuing protocol. The predefined queuing protocol may be any protocol for queuing incoming requests. For example, the master lock monitor (110) may select requests for fulfillment in first-in-first-out (FIFO) order or may use more detailed criteria such as most recently used or most frequently used. In one or more embodiments of the invention, a priority value may be calculated for each request based on the requesting client, the type of resource being requested (e.g., specified tables/rows/fields in a DBMS instance, specified files in a file system), and/or any other predefined criteria.

In one or more embodiments of the invention, the master lock monitor (110) includes functionality to modify and/or maintain the variable lock database (112). The variable lock database (112) may include lock related data including one or more lock state elements, lock queues, and/or metadata associated with such data.

In one or more embodiments of the invention, the master lock monitor (110) includes functionality to grant a contended non-exclusive lock on a resource to a client. The master lock monitor (110) may also monitor the shared memory (106) in order to detect any exclusive locks or lock requests which may require queuing or conversion of lock types.

In one or more embodiments of the invention, the master lock monitor (110) includes functionality to modify the shared memory (106) in response to one or more requests. When receiving a lock request, the master lock monitor (110) is configured to identify, based on a hash function, a hash bucket corresponding to the requested resource. The master lock monitor (110) may, like the accelerator (104), grant the lock request if the hash bucket is empty. If the hash bucket is occupied, the master lock monitor (110) may queue the lock request. If a collision is detected, the master lock monitor (110) may check whether the resource is locked in the variable lock database (112). If the master lock monitor (110) determines that the resource is incompatibly locked in the variable lock database (112), the master lock monitor (110) then queues the request. If the master lock monitor (110) determines that the resource is not incompatibly locked, the master lock monitor (110) may modify the variable lock database (112) to indicate that the resource is locked and grant the lock request to the requesting client.

Additionally, due to the fact that the hash bucket is occupied by another lock request (i.e., because of the collision), the master lock monitor (110) may be configured to add the request to a specialized locked queue corresponding to the hash bucket. Thus, if the lock state element occupying the hash bucket is released, the master lock monitor (110) is configured to transfer another lock state element from the specialized locked queue to the hash bucket. If a lock corresponding to an entry in the specialized locked queue is released prior to the hash bucket being emptied, the entry is removed from the specialized locked queue.

In one or more embodiments of the invention, the master lock monitor (110) is configured to remove a lock state element from the shared memory (106) in response to an unlock request. In one or more embodiments of the invention, the master lock monitor (110) is configured to accept both lock and unlock requests, while the accelerator (104) is configured to accept only lock requests.

In one or more embodiments of the invention, each hash bucket holds a single lock state element. Alternatively, the hash buckets may be configured to hold any number of lock state elements. If multiple lock state elements exist per hash bucket, both the accelerator (104) and the master lock monitor (110) may be configured to search the entries in the hash bucket when checking to exclusive locks. The accelerator (104) and the master lock monitor (110) may also be configured to add an entry to the hash bucket if an empty slot is available in the bucket. In the case where multiple lock state elements may reside in each hash bucket, the hash bucket is said to be empty if a lock state element corresponding to the requested resource does not exist in the hash bucket and at least one empty slot exists in the hash bucket. The hash bucket is deemed to be occupied if a lock state element corresponding to the resource exists in the hash bucket, regardless of how many other lock state elements reside in the bucket (if any). Lastly, the accelerator (104) and the master lock monitor (110) may be configured to determine that a collision has occurred if all entries in the hash bucket are occupied by lock state elements and there is no lock state element corresponding to the requested resource in the hash bucket.

In one or more embodiments of the invention, the master lock monitor (110) includes functionality to disable and/or enable the accelerator (104). The master lock monitor (110) may disable the accelerator in order to modify the size of the shared memory (106), update the contents of the shared memory, perform maintenance operations, and/or in response to input from a user or entity (e.g., a DBMS updater).

One or more components of the systems and/or methods disclosed herein may be implemented within a database management system (DBMS), a file system, and/or an operating system. The DBMS, file system, and/or operating system may reside within a single computer system, or may be distributed across a set of computer systems connected by a network. For example, the accelerator (104), master lock monitor (110), shared memory (106), and/or variable lock database may be an integrated part of or operatively connected to a clustered DBMS system deployed across one or more networks.

Figure 2:
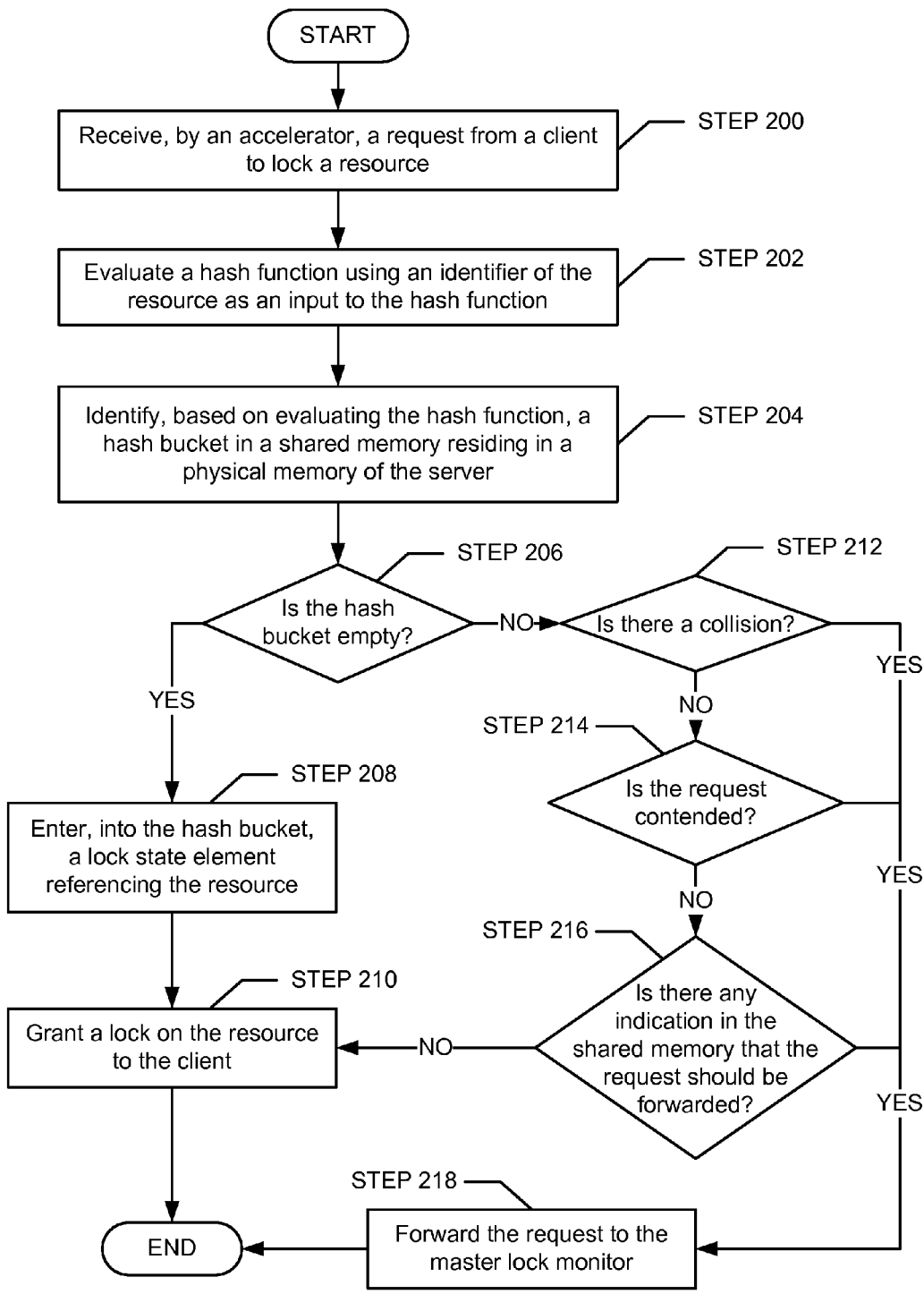
FIGS. 2 and 3 show flowcharts in accordance with one or more embodiments of the invention.

FIG. 2 shows a flowchart of a method for locking a resource. While the various steps in this flowchart are presented and described sequentially, one of ordinary skill will appreciate that some or all of the steps may be executed in different orders and some or all of the steps may be executed in parallel. Further, in one or more embodiments of the invention, one or more of the steps described below may be omitted, repeated, and/or performed in a different order. Accordingly, the specific arrangement of steps shown in FIG. 2 should not be construed as limiting the scope of the invention.

In STEP 200, in one or more embodiments of the invention, a request to lock a resource is received by an accelerator. The accelerator may be executing in a kernel space of a server or a device processor space of a hardware device (e.g., a network interface card of the server). The request is received from a client and is for an exclusive (i.e., non-shared) lock on the resource. For example, the request may be received from a database query thread executing as foreground process within a physical node of a distributed DBMS.

In STEP 202, in one or more embodiments of the invention, a hash function is evaluated using an identifier of the resource as an input to the hash function. The hash function may be evaluated by the accelerator or a process associated with the accelerator.

In STEP 204, in one or more embodiments of the invention, a hash bucket is identified in a shared memory residing in a physical memory of the server. The hash bucket may be identified as an output of the hash function. At this point, the accelerator locks the hash bucket to avoid simultaneous operation by either other accelerator threads, or threads in the user level master lock monitor.

In STEP 206, in one or more embodiments of the invention, it is determined whether the hash bucket is empty. An empty hash bucket is an indication that the resource is not locked by any other clients. If it is determined that the hash bucket is empty, the process proceeds to STEP 208. If it is determined that the hash bucket is not empty, the process proceeds to STEP 212.

In STEP 208, in one or more embodiments of the invention, a lock state element referencing the resource is entered into the identified hash bucket. Entering the lock state element may involve populating one or more fields including a lock ID, a lock mode, and/or any number of other relevant fields, in accordance with various embodiments of the invention. After examination and/or modification of the hash bucket, the lock on the hash bucket is released.

In STEP 210, in one or more embodiments of the invention, a lock is granted on the resource to the client. Granting the lock may include sending a message to the client notifying the client of the granted lock and/or sending a notification to a master lock monitor to update the variable lock database.

In STEP 212, in one or more embodiments of the invention, a determination is made whether a collision has occurred. If the lock state element currently in the hash bucket references a different resource than the request, then a collision has occurred and the process proceeds to STEP 218. If the lock state element currently in the hash bucket references the same resource and the request, then a collision has not occurred and the process proceeds to STEP 214.

In STEP 214, in one or more embodiments of the invention, a determination is made whether the request is contended. If the mode of the request is incompatible with the mode of the currently held lock, then the request is deemed to be contended and the process proceeds to STEP 218. Conversely, if the mode of the request is not incompatible with the mode of the currently held lock, then the request is deemed to be uncontended and the process proceeds to STEP 216.

In STEP 216, in one or more embodiments of the invention, a determination is made whether there is any indication in the shared memory that the request should be forwarded to the master lock monitor. Examples of such an indication may include a non-zero pending request count and an out-of-order flag. If it is determined that such an indication exists, the process proceeds to STEP 218. If it is determined that such an indication does not exist, the process proceeds to STEP 210.

In STEP 216, in one or more embodiments of the invention, the request is forwarded to the master lock monitor for fulfillment. The master lock monitor may queue the request according to a predefined queuing protocol and/or modify the request or an existing lock on the resource in order to grant the request, in accordance with various embodiments of the invention.

Figure 3:
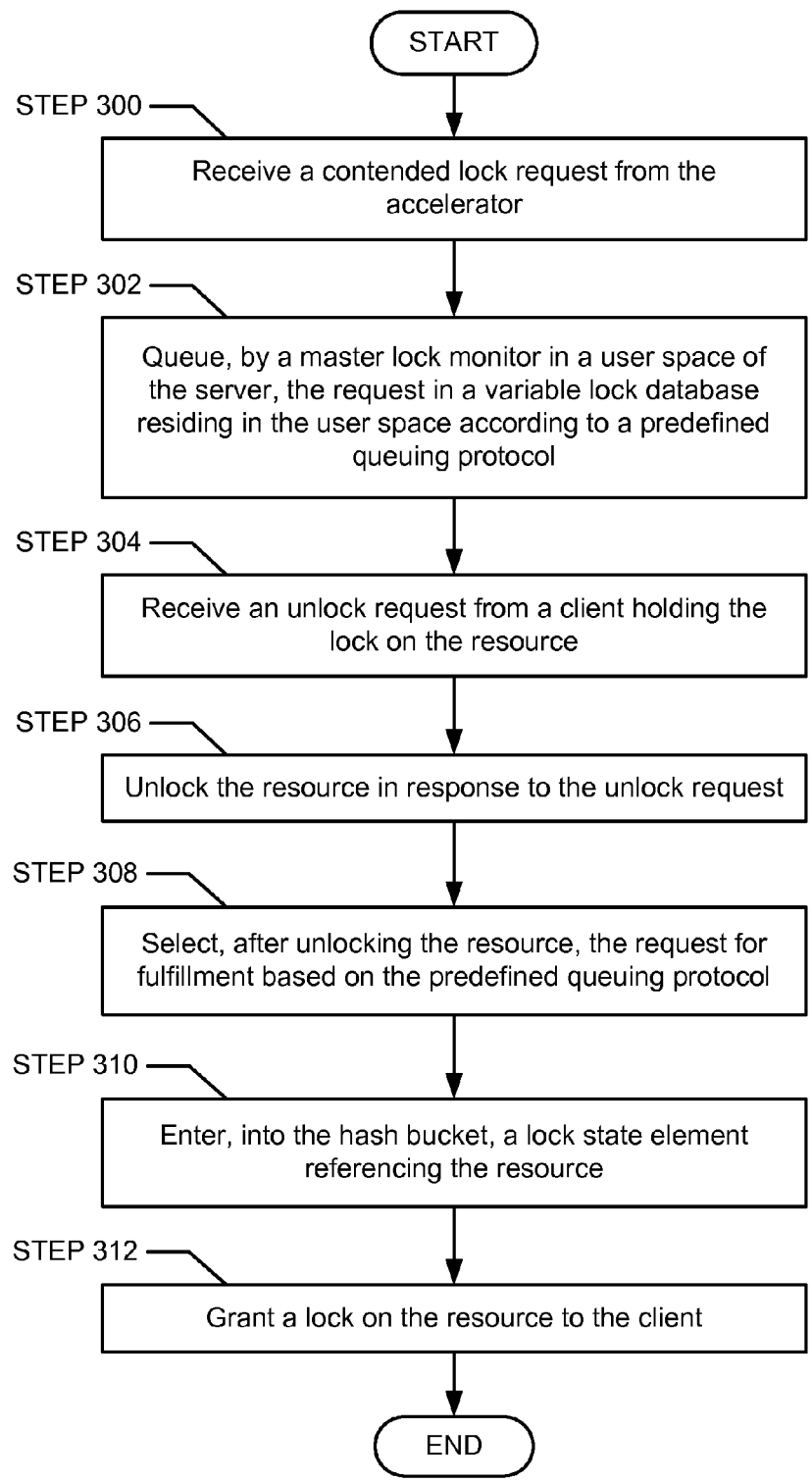

FIG. 3 shows a flowchart of a method for locking a resource using a predefined queuing protocol. While the various steps in this flowchart are presented and described sequentially, one of ordinary skill will appreciate that some or all of the steps may be executed in different orders and some or all of the steps may be executed in parallel. Further, in one or more embodiments of the invention, one or more of the steps described below may be omitted, repeated, and/or performed in a different order. Accordingly, the specific arrangement of steps shown in FIG. 3 should not be construed as limiting the scope of the invention.

In STEP 300, in one or more embodiments of the invention, a contended lock request for a resource which is already locked by another client is received from the accelerator.

In STEP 302, in one or more embodiments of the invention, the request is queued in a variable lock database residing in a user space of the server. The request may be queued by a master lock monitor (e.g., master lock monitor (110) of FIG. 1A, discussed above) according to a predefined queuing protocol.

In STEP 304, in one or more embodiments of the invention, an unlock request is received from a client holding the lock on the resource. The unlock request may also include the resource identifier. In response to the unlock request, one or more uncommitted transactions may be committed according to a protocol for data synchronization between a shared memory, a variable lock database, and/or any relevant cached resource modification transactions.

In STEP 306, in one or more embodiments of the invention, the resource is unlocked in response to the unlock request. Unlocking the resource involves removing a lock state element corresponding to the resource being unlocked from the shared memory.

In STEP 308, in one or more embodiments of the invention, the request is selected, after unlocking the resource, for fulfillment based on the predefined queuing protocol. After removing the lock state element, the lock resource (which maps to the same hash bucket) may be selected. For example, if the request is the first element entered into a FIFO queue, the master lock monitor may select it for fulfillment.

In STEP 310, in one or more embodiments of the invention, a lock state element referencing the resource is entered into the hash bucket. The master lock monitor may enter the lock state element in accordance with a synchronization algorithm for modifying the shared memory between the accelerator and the master lock monitor.

In STEP 312, in one or more embodiments of the invention, a lock on the resource is granted to the client. Granting the resource may include sending, by the master lock monitor, a notification to the requesting client that the lock is granted.

The following section describes various examples of the invention. The examples are included to aid in the understanding of the invention but are not intended to limit the scope of the invention.

Figure 4:
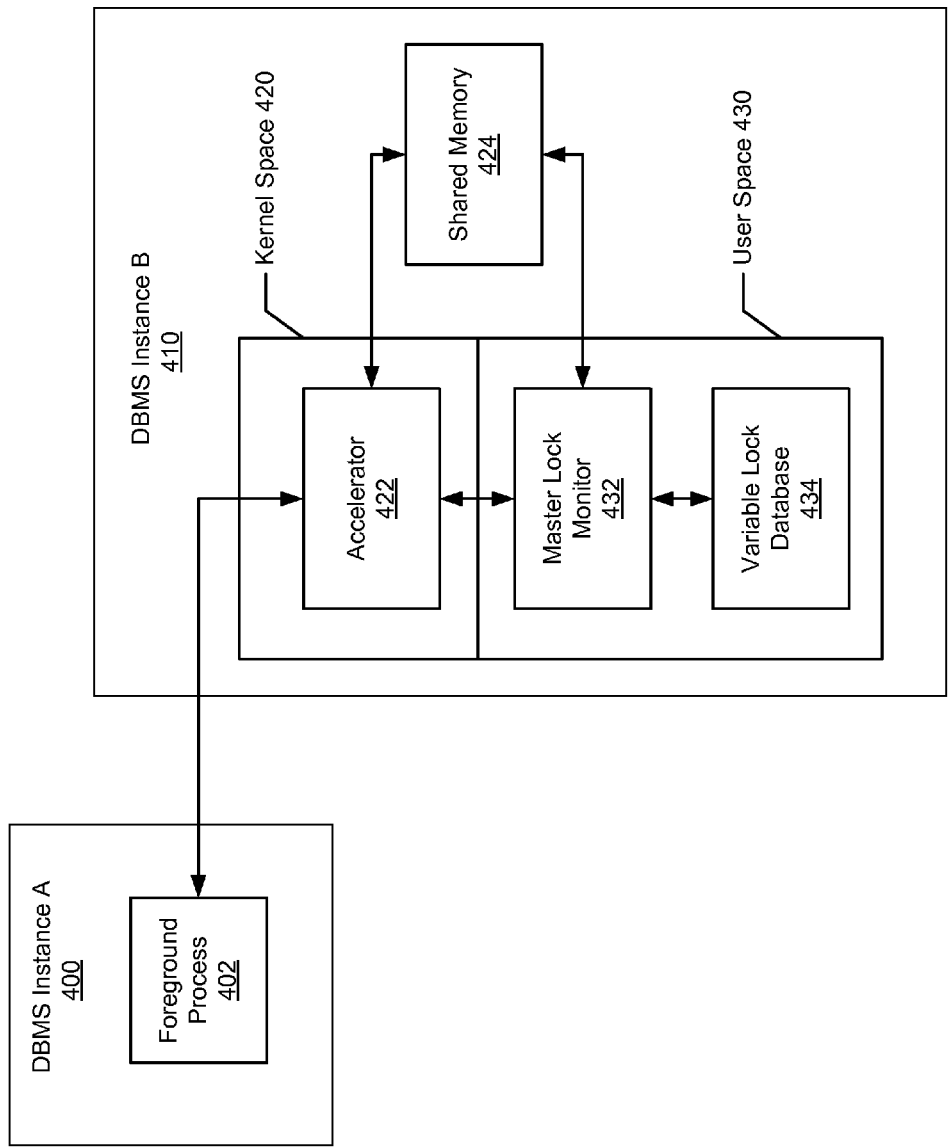
FIG. 4 shows an example system in accordance with one or more embodiments of the invention.

FIG. 4 depicts an example of a clustered distributed database management system (DBMS) in accordance with one or more embodiments of the invention. The clustered DBMS has two nodes, with DBMS Instance A (400) executing on a first node and DBMS Instance B (410) executing on a second node. In this example, a foreground process (402) at the first node attempts update a row in a table of the DBMS in response to a structured query language (SQL) UPDATE command.

The foreground process identifies the master DBMS instance of the row as DBMS Instance B (410). The foreground process then sends the row-level lock request to the accelerator (422) residing in the kernel space (420) of DBMS Instance B (410). The row-level lock request includes a resource ID of the row obtained from metadata within DBMS Instance A (400).

The accelerator (422) of DBMS Instance B (410) receives the row-level lock request and evaluates a hash function using a resource ID of the row as input. The hash function identifies a hash bucket in the shared memory (424). In this example, the shared memory (424) resides entirely in a random access memory (RAM) of a computing device executing the DBMS Instance B (410). The accelerator (422) determines that a lock state element exists in the hash bucket. The accelerator (422) compares a lock ID value of the lock state element with the resource ID and determines that they match.

Continuing the example, the accelerator (422) then determines that the lock mode of the lock state element is set to an exclusive lock (i.e., the hash bucket is occupied). Thus, another client has a lock on the row and the lock request must be queued. In response to determining that the resource is exclusively locked, the accelerator (422) forwards the lock request to the master lock monitor (432) in user space (430).

Continuing the example, the master lock monitor (432) then queues the lock request within a data structure in the variable lock database (434) using a predefined queuing protocol. At some later time, after the exclusive lock on the row has been released and in accordance with the queuing protocol, the master lock monitor (432) grants the client an exclusive lock on the row by inserting a lock state element referencing the resource ID and the client into the shared memory (424).

In this example, the foreground process (402), upon receiving the lock, generates a request to lock the table storing the row. This is done to prevent a table drop or other potentially conflicting operations while the row-level lock is held by the client. The foreground process (402) then identifies DBMS Instance B (410) as the master instance of the table. The foreground process (402) then sends the table lock request to the accelerator (422) for fulfillment.

Continuing the example, the accelerator (422) receives the table lock request and evaluates a hash function using a resource ID of the table as input. The hash function identifies an existing lock state element in the shared memory (424). The accelerator (422) compares a lock ID value of the lock state element with the resource ID and determines that they do not match (i.e., a hash collision has occurred).

In response to the collision, the accelerator (422) forwards the table lock request to the master lock monitor (432). The master lock monitor (432) identifies a record corresponding to the resource ID in the variable lock database (434) and determines that the table is not locked. Thus, despite the hash bucket being occupied, the master lock monitor (432) grants an exclusive lock on the table to the requesting client. The master lock monitor (432) updates the record in the variable lock database (434) to indicate that the table is locked and then notifies the foreground process (402) that the request is granted. Additionally, the master lock monitor (432) adds an entry to a specialized locked queue holding exclusive locks on resources mapping to the occupied hash bucket. At some later time, according to a predefined queuing protocol, the hash bucket is updated to replace the existing lock state element with a lock state element referencing the resource ID of the table and the foreground process (402). Finally, when the lock is released by the foreground process (402), the lock state element is removed from the shared memory (424).

Figure 5:
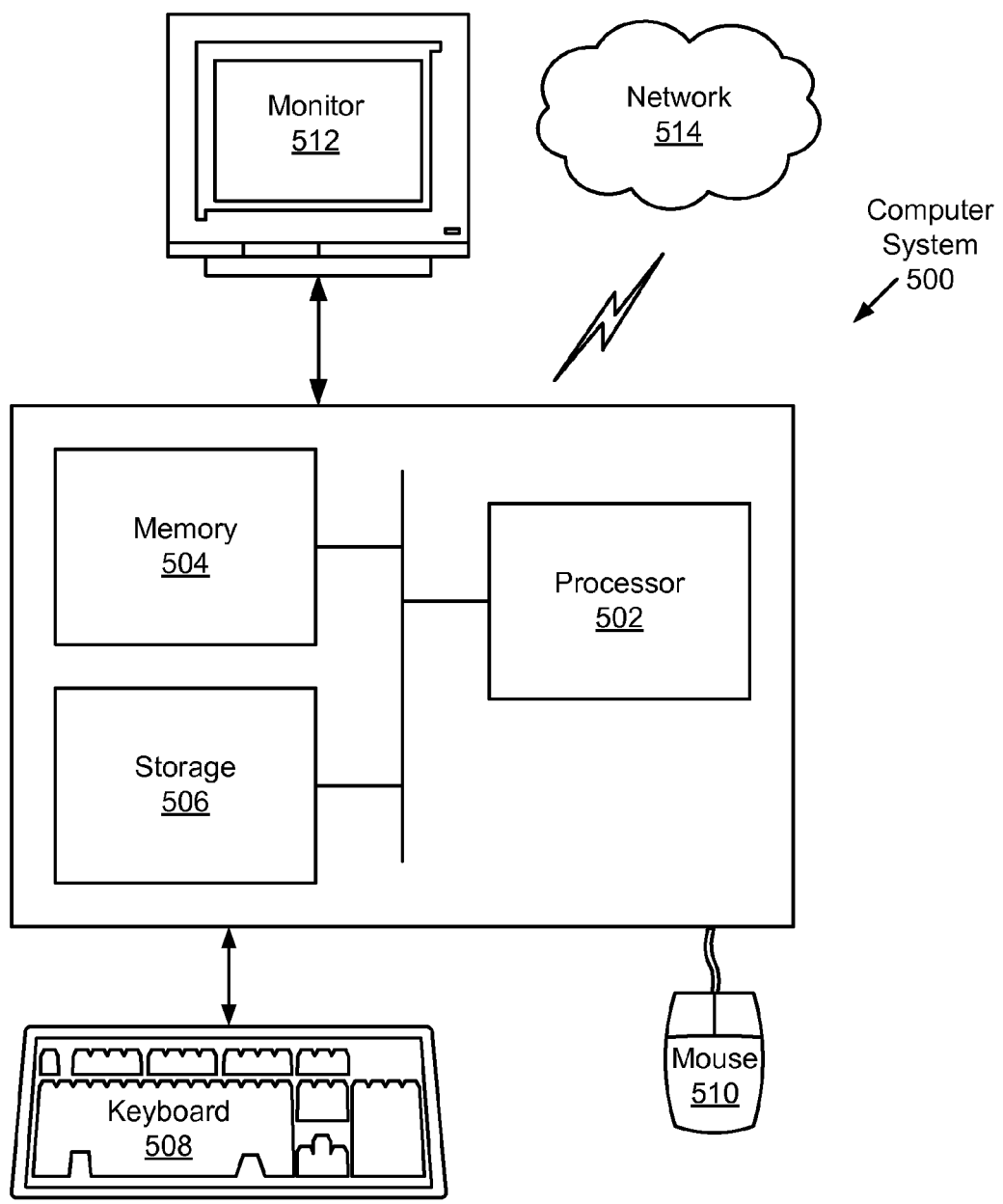
FIG. 5 shows a computer system in accordance with one or more embodiments of the invention.

Embodiments of the invention may be implemented on virtually any type of computer regardless of the platform being used. For example, as shown in FIG. 5, a computer system (500) includes one or more processor(s) (502) (such as a central processing unit (CPU), integrated circuit, hardware processor, etc.), associated memory (504) (e.g., RAM, cache memory, flash memory, etc.), a storage device (506) (e.g., a hard disk, an optical drive such as a compact disk drive or digital video disk (DVD) drive, a flash memory stick, etc.), and numerous other elements and functionalities typical of today's computers (not shown). The computer system (500) may also include input means, such as a keyboard (508), a mouse (510), or a microphone (not shown). Further, the computer system (500) may include output means, such as a monitor (512) (e.g., a liquid crystal display (LCD), a plasma display, or cathode ray tube (CRT) monitor). The computer system (500) may be connected to a network (514) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (500) includes at least the minimal processing, input, and/or output means necessary to practice embodiments of the invention.

Further, in one or more embodiments of the invention, one or more elements of the aforementioned computer system (500) may be located at a remote location and connected to the other elements over a network. Further, embodiments of the invention may be implemented on a distributed system having a plurality of nodes, where each portion of the invention (e.g., accelerator (104), master lock monitor (110), etc. of FIG. 1, discussed above) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a tape, memory, or any other tangible computer readable storage device.

One or more embodiments of the invention have one or more of the following advantages. By granting uncontended lock requests using an accelerator in a kernel/device processor space of a server, it may be possible to reduce the latency of certain requests. Depending on data and usage requirements, it may also be possible to achieve increased efficiency and scalability by utilizing a shared memory residing in physical memory to store exclusive locks on resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for locking resources, comprising:
receiving, by an accelerator, a first request from a first client to place a first lock on a first resource,
wherein the first lock is a right for the first client to use the first resource;
identifying, by the accelerator executing on the computer processor and based on a first identifier of the first resource, a first entry of a data structure stored in a shared memory residing in a physical memory of the server;
detecting that the first entry is occupied by determining that the first entry is storing a first lock state element comprising a non-Null lock identifier;
sending the first request to a master lock monitor residing in a user space of the server based at least on detecting that the first entry is occupied;
granting, by the master lock monitor, the first lock on the first resource to the first client;
receiving, by the accelerator, a second request from a second client to place a second lock on a second resource, wherein the second lock is a right for the second client to use the second resource;
identifying, based on a second identifier of the second resource, a second entry of the data structure in the shared memory;
detecting that the second entry is empty, indicating that the second resource is not currently locked;
entering, in response to detecting that the second entry is empty, a second lock state element referencing the second resource into the second entry; and
granting, after entering the second lock state element, without sending the second request to the master lock monitor and based at least in part on detecting that the second entry is empty, the second lock on the second resource to the second client.

2. The method of claim 1, further comprising:
identifying a mode of the first lock state element; and
determining that the mode of the first lock state element and a mode of the first request are incompatible, wherein sending the first request to the master lock monitor is further based on determining that the mode of the first lock state element and a mode of the first request are incompatible.

3. The method of claim 1, wherein granting, by the master lock monitor, the first lock on the first resource to the first client further comprises:
receiving the first request by the master lock monitor;
queuing, in a variable lock database residing in the user space, the first request according to a predefined queuing protocol;
unlocking, after queuing the first request, the first resource in response to an unlock request;
selecting, after unlocking the first resource, the first request for fulfillment based on the predefined queuing protocol;
overwriting, by the master lock monitor, the first lock state element with a second lock state element referencing the first resource into the first entry; and
granting, after entering the second lock state element, the first lock on the first resource to the first client.

4. The method of claim 1, further comprising:
sending, by the master lock monitor, a command to disable the accelerator; and
disabling the accelerator in response to the command, wherein the accelerator forwards subsequent lock and unlock requests to the master lock monitor for fulfillment after being disabled.

5. The method of claim 1, wherein:
the accelerator resides in one selected from a group consisting of a kernel space of the server and a device processor space of a device;
the data structure is a hash table comprising a hash function;
the first entry is a hash bucket; and
the hash bucket is a smaller data set to which a larger data set is mapped via the hash function.

6. The method of claim 1, further comprising:
identifying a consult master field within the first lock state element residing in the first entry; and
reading a value of the consult master field, wherein sending the first request to the master lock monitor is further based on the value.

7. The method of claim 1, wherein the first resource is a row in a database management system (DBMS) instance, and wherein the DBMS instance comprises the accelerator, the master lock monitor, and the shared memory.

8. The method of claim 1, wherein the first resource is a file in a file system, and wherein the file system comprises the accelerator, the master lock monitor, and the shared memory.

9. The method of claim 1, wherein the first client is a database management system (DBMS) instance in a distributed database cluster.

10. A method for locking resources, comprising:
receiving, by an accelerator, a first request from a first client to place a first lock on a first resource,
wherein the accelerator resides in one selected from a group consisting of a kernel space and a device processor space, and
wherein the first lock is a right for the first client to use the first resource;
determining, by the accelerator executing on a computer processor, that the resource is exclusively locked by identifying a mode in a lock state element stored in an entry of a data structure, wherein the mode comprises an indication that the resource is exclusively locked;
sending the request to a master lock monitor residing in user space in response to determining that the resource is exclusively locked;
granting, by the master lock monitor, the first lock on the first resource to the first client;
receiving, by the accelerator, a second request from a second client to place a second lock on a second resource, wherein the second lock is a right for the second client to use the second resource;
identifying, based on a second identifier of the second resource, a second entry of the data structure in the shared memory;
detecting that the second entry is empty, indicating that the second resource is not currently locked;

entering, in response to detecting that the second entry is empty, a second lock state element referencing the second resource into the second entry; and granting, after entering the second lock state element, without sending the second request to the master lock monitor and based at least in part on detecting that the second entry is empty, the second lock on the second resource to the second client.

11. A system for locking resources, comprising:
a computer processor;
a physical memory comprising a shared memory;
an accelerator, executing on the computer processor and configured to:
    receive a first request from a first client to place a first lock on a first resource, wherein the first lock is a right for the first client to use the first resource;
    identify, based on the identifier of the first resource, a first entry of a data structure in the shared memory;
    detect that the first entry is occupied by determining that the first entry is storing a first lock state element comprising a non-Null lock identifier;
    send the first request to a master lock monitor based at least on detecting that the first entry is occupied
    receive a second request from a second client to place a second lock on a second resource, wherein the second lock is a right for the second client to use the second resource;
    identify, based on a second identifier of the second resource, a second entry of the data structure in the shared memory;
    detect that the second entry is empty, indicating indicates that the second resource is not currently locked;
    enter, in response to detecting that the second entry is empty, a second lock state element referencing the second resource into the second entry; and
    grant, after entering the second lock state element, without sending the second request to the master lock monitor and based at least in part on detecting that the second entry is empty, the second lock on the second resource to the second client; and
a user space, comprising:
    a virtual memory comprising a variable lock database; and
    the master lock monitor, wherein the master lock monitor is configured to grant the first lock on the first resource to the first client.

12. The system of claim 11, wherein the master lock monitor is configured to grant the first lock on the first resource to the first client by:
    receiving the first request from the accelerator;
    queueing, in the variable lock database, the first request according to a predefined queuing protocol;
    unlocking, after queuing the first request, the first resource in response to an unlock request;
    selecting, after unlocking the first resource, the first request for fulfillment based on the predefined queuing protocol;
    overwriting the first lock state element with a second lock state element referencing the first resource into the first entry; and
    granting, after entering the second lock state element, the first lock on the first resource to the first client.

13. The system of claim 11, wherein the master lock monitor is configured to:
    disable the accelerator, wherein the accelerator forwards subsequent lock and unlock requests to the master lock monitor for fulfillment after being disabled.

14. A non-transitory computer-readable storage medium comprising a plurality of instructions for locking resources, the plurality of instructions comprising functionality to:
    receive, by an accelerator, a first request from a first client to place a first lock on a first resource,
        wherein the first lock is a right for the first client to use the first resource;
    identify, based on a first identifier of the first resource, a first entry of a data structure in a shared memory residing in a physical memory of the server;
    detect that the first entry is occupied by determining that the first entry is storing a first lock state element comprising a non-Null lock identifier;
    send the first request to a master lock monitor residing in a user space of the server based at least on detecting that the first entry is occupied;
    grant, by the master lock monitor, the first lock on the first resource to the first client;
    receive, by the accelerator, a second request from a second client to place a second lock on a second resource, wherein the second lock is a right for the second client to use the second resource;
    identify, based on a second identifier of the second resource, a second entry of the data structure in the shared memory;
    detect that the second entry is empty, indicating that the second resource is not currently locked;
    enter, in response to detecting that the second entry is empty, a second lock state element referencing the second resource into the second entry; and
    grant, after entering the second lock state element, without sending the second request to the master lock monitor and based at least in part on detecting that the second entry is empty, the second lock on the second resource to the second client.

15. The non-transitory computer-readable storage medium of claim 14, wherein the plurality of instructions further comprise functionality to grant, by the master lock monitor, the first lock on the first resource to the first client by:
    receiving the first request by the master lock monitor;
    queueing, in a variable lock database residing in the user space, the first request according to a predefined queuing protocol;
    unlocking, after queuing the first request, the first resource in response to an unlock request;
    selecting, after unlocking the first resource, the first request for fulfillment based on the predefined queuing protocol;
    entering, by the master lock monitor, a second lock state element referencing the first resource into a first hash bucket; and
    granting, after entering the first lock state element, the first lock on the first resource to the first client.

16. The non-transitory computer-readable storage medium of claim 14, wherein the plurality of instructions further comprise functionality to:
    send, by the master lock monitor, a command to disable the accelerator; and
    disable the accelerator in response to the command, wherein the accelerator forwards subsequent lock and unlock requests to the master lock monitor for fulfillment after being disabled.

* * * * *